(12) United States Patent
Okado

(10) Patent No.: US 6,347,194 B2
(45) Date of Patent: Feb. 12, 2002

(54) APPARATUS INCLUDING RECORDING HEAD, READING HEAD, AND WINDING PORTION WITH INTERNAL MOTOR

(75) Inventor: Teruyuki Okado, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/935,907

(22) Filed: Sep. 23, 1997

(30) Foreign Application Priority Data

Sep. 30, 1996 (JP) .............................. 8-276887

(51) Int. Cl.⁷ .............................. G03B 17/24; G03B 1/00
(52) U.S. Cl. ...................................... 396/319; 396/418
(58) Field of Search .................... 396/310, 311, 396/319, 320, 387, 418, 535

(56) References Cited

U.S. PATENT DOCUMENTS

| 4,864,332 A | | 9/1989 | Harvey | 354/21 |
|---|---|---|---|---|
| 5,130,728 A | * | 7/1992 | Goto et al. | 396/310 |
| 5,555,047 A | * | 9/1996 | Tguji et al. | 396/319 |
| 5,634,158 A | * | 5/1997 | Shen et al. | 396/320 |
| 5,649,253 A | * | 7/1997 | Cocca | 396/392 |
| 5,701,531 A | * | 12/1997 | Tahara et al. | 396/319 |
| 5,715,488 A | * | 2/1998 | Sasaki et al. | 396/319 |
| 5,737,653 A | * | 4/1998 | Tokui | 396/319 |
| 5,742,856 A | * | 4/1998 | Izukawa | 396/319 |
| 5,857,123 A | * | 1/1999 | Miyamoto et al. | 396/319 |
| 5,983,037 A | * | 11/1999 | Miyamoto et al. | 396/319 |
| 6,092,023 A | * | 7/2000 | Kunshige | 702/1 |
| 6,154,617 A | * | 11/2000 | Miyamoto | 396/319 |

FOREIGN PATENT DOCUMENTS

JP 6-3741 1/1994

* cited by examiner

*Primary Examiner*—Christopher E. Mahoney
(74) *Attorney, Agent, or Firm*—Fitzpatrick, Cella, Harper & Scinto

(57) ABSTRACT

A camera in which a film is fed from a film cartridge and is wound around a film winding portion, the camera having a recording head for recording magnetic information on the film and a reading head for reading the magnetic information from the film. The reading head is placed away from the film winding portion farther than the recording head is away from the film winding portion.

4 Claims, 10 Drawing Sheets

[WHEN FRAMES ARE SET]

[WRITING START POSITION]

[WRITING END POSITION OR READING START POSITION]

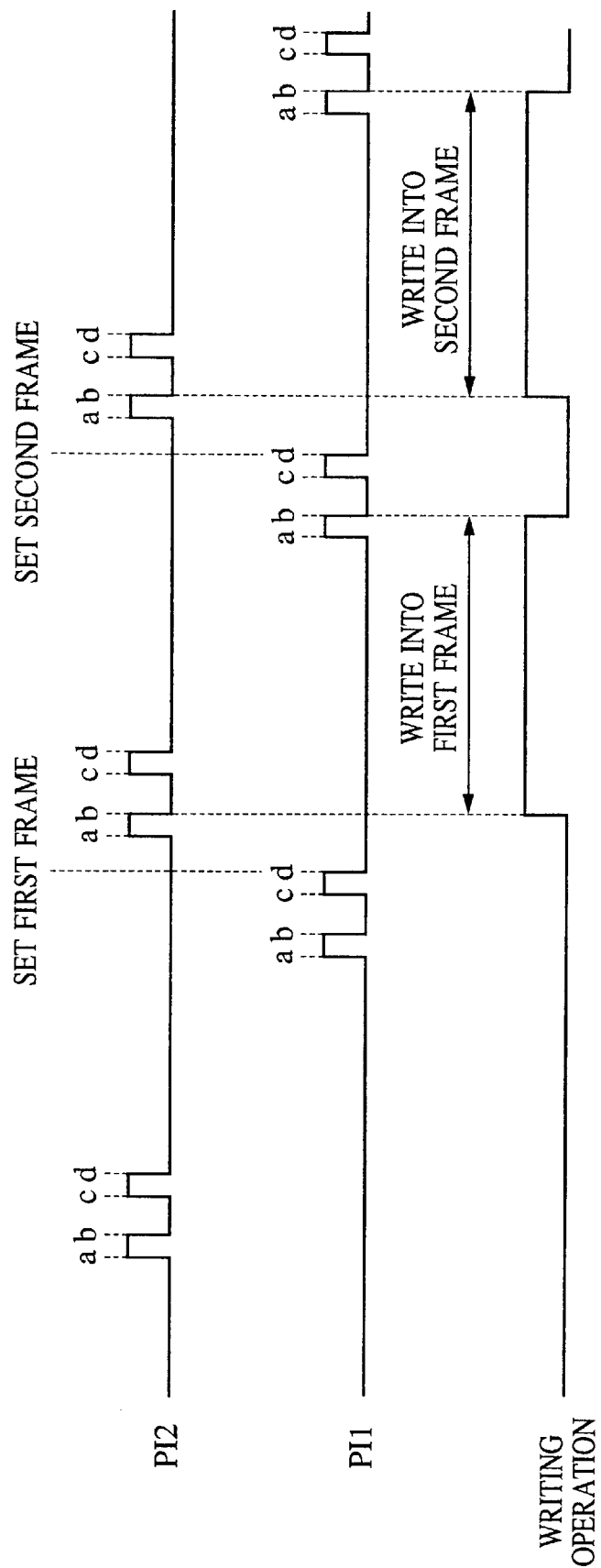

APPARATUS INCLUDING RECORDING HEAD, READING HEAD, AND WINDING PORTION WITH INTERNAL MOTOR

BACKGROUND OF THE INVENTION

1. Field of the Invention

The present invention relates to a camera using film provided with a magnetic recording section on which information, such as film information and photographic information, is recorded.

2. Description of the Related Art

A technique for recording and reproducing such film information and photographic information on and from a magnetic recording section provided for film is disclosed in the U.S. Pat. No. 4,864,332.

In the camera using the above type of film, exposure information can be detected from a cartridge indicator and magnetic information recorded on the film. By virtue of the exposure information, even after the partially exposed film has been rewound and removed from the camera, it can be reused by setting an unexposed frame of the film in the aperture of the camera.

The above type of camera requires a writing magnetic head for recording magnetic information on the film which is being fed and a reading magnetic head for reproducing magnetic information from the film. Cameras provided with a single magnetic head for writing and reading magnetic information have already been put into practice. Such a magnetic head is, however, generally large and is sometimes difficult to fit into the camera in terms of the layout of the product.

In contrast, the camera in which a writing magnetic head and a reading magnetic head are separately provided has been proposed in Japanese Patent Laid-Open No. 6-3741. In this camera both magnetic heads can be downsized, thereby making the layout of the product relatively easy.

In the above-described double-magnetic-head camera, the magnetic information which has just been written by the writing head is immediately read so as to check in real time whether it has been correctly recorded on the film. In order to implement this checking system, the reading magnetic head should be located near the leading portion of the film in the direction in which the film is fed, while the writing magnetic head should be placed in the vicinity of the trailing portion of the film. In general, the writing magnetic head is located also at the edge of the aperture (near the take-up spool) to facilitate the operation of writing information concerning the exposed frames into the magnetic recording section, which operation is performed when the exposed film is wound up. Accordingly, the reading magnetic head is inevitably placed closer to the take-up spool than the writing magnetic head.

The following problem is encountered when the reading magnetic head is located near the take-up spool. Most take-up spools contain a feeding motor, and noise from the motor sometimes travels to the reading magnetic head while reading the magnetic information, thereby causing reading errors.

Moreover, the flatness of the film is impaired when the reading magnetic head is placed in the vicinity of the take-up spool, although the flatness of the aperture is ensured because of the presence of a film feeding passage using a pressing plate. Accordingly, the reading magnetic head cannot always properly contact the film while the film is fed, and reading errors concerning the magnetic information may also occur. Due to the reading errors, double exposure may be caused when the foregoing type of camera is used in which the partially exposed film can be reused upon determination as to whether the film frames are exposed or unexposed based on the written magnetic information.

SUMMARY OF THE INVENTION

According to one aspect of the present invention, there is provided a camera in which a film is fed from a film cartridge and is wound around a film winding portion. The camera comprises: a recording head for recording magnetic information on the film, and a reading head for reading the magnetic information from the film. The reading head is placed away from the film winding portion farther than the recording head is away from the film winding portion. With this arrangement, magnetic-information reading errors from the film can be minimized. Further, the camera is easy to fabricate in terms of the layout of the product.

Other aspects of the present invention will become apparent from the following description of the preferred embodiments with reference to the attached drawings.

BRIEF DESCRIPTION OF THE DRAWINGS

FIG. 4 is a timing chart illustrating the information-writing operation according to the first and second embodiments of the present invention;

DESCRIPTION OF THE PREFERRED EMBODIMENTS

Preferred embodiments of the present invention will now be explained with reference to the drawings.

Figure 1:
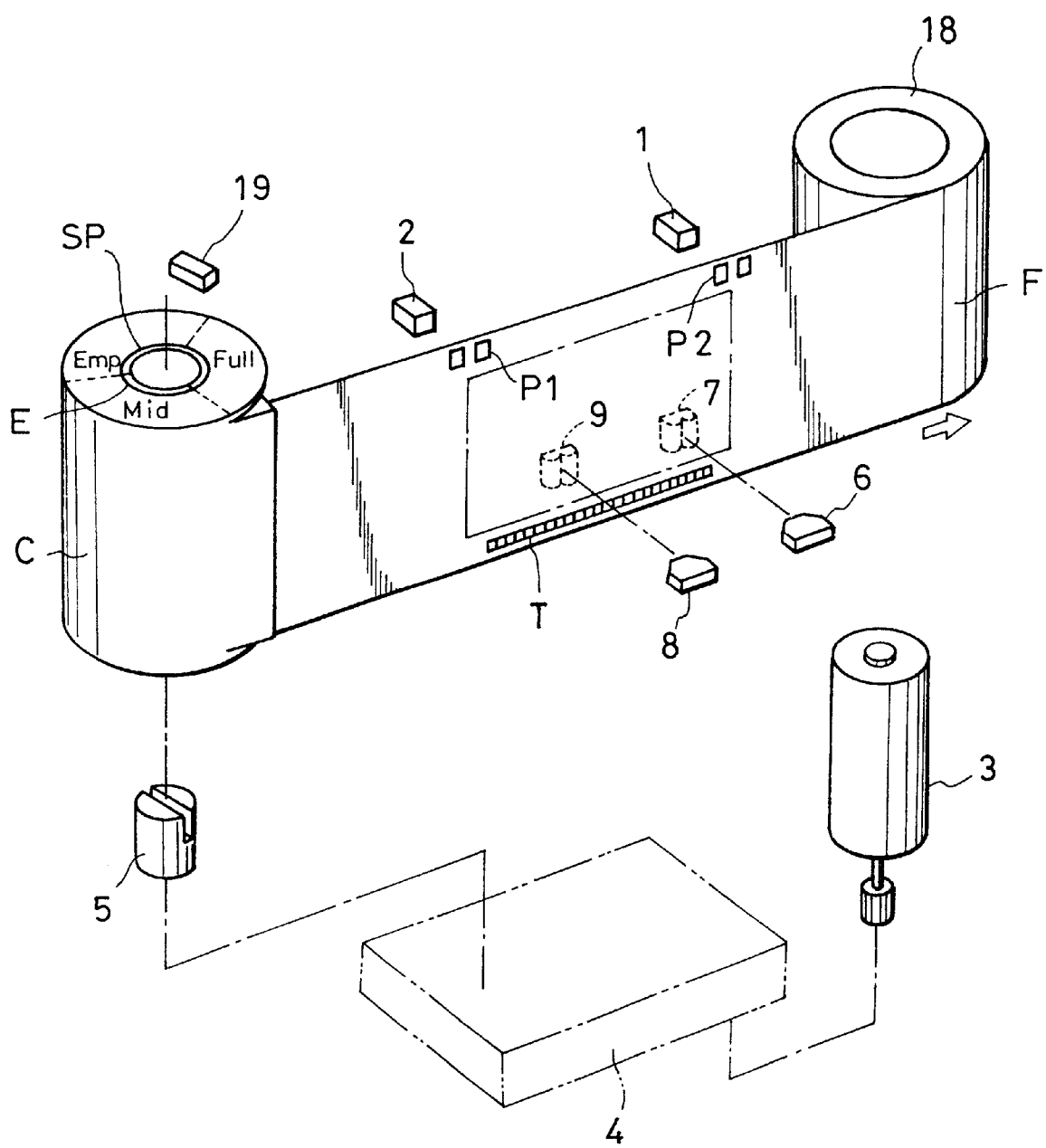
FIG. 1 is an exploded perspective view illustrating the schematic internal configuration of a camera according to a first embodiment of the present invention.

FIG. 1 is an exploded perspective view illustrating the schematic internal configuration of a camera according to a first embodiment of the present invention. In FIG. 1, a photoreflector 1 detects perforations P1 and P2 provided in a film F so as to feed the film F for a predetermined distance, and also outputs a timing signal for starting an operation to write magnetic information into a magnetic recording section (hereinafter also referred to as "the track T") and a timing signal for commencing an operation to read the written magnetic information. Reference numeral 2 also indicates a photoreflector which detects the perforations P1 and P2 so as to feed the film F for a predetermined distance and also outputs a timing signal for completing the writing operation of magnetic information into the track T formed on the film F. A feeding motor 3 for winding and unwinding the film F is disposed within a take-up spool 18. A gear mechanism 4 is used to decrease the speed and switches between winding and unwinding of the film F. Reference numeral 5 represents an unwinding fork.

A writing magnetic head 6 for writing magnetic information into the track T of the film F is located, as shown in FIG. 1, near the leading portion of the film F. A pressing pad 7 is provided to press the film F against the writing magnetic head 6. A reading magnetic head 8 for reading magnetic information from the track T of the film F is placed, as illustrated in FIG. 1, in the vicinity of the trailing portion of the film F. The above arrangement of the heads 6 and 8 originates from the fact that reading magnetic head 8 is more vulnerable to noise than the writing magnetic head 6, as noted in the description of the related art. Accordingly, the reading magnetic head 8 is placed away from the motor 3 and is thus protected from magnetic noise produced by the motor 3 while magnetic information is read. Also, with the above arrangement of the heads 6 and 8, the reading magnetic head 8 can be located at a position matching the aperture, thereby ensuring the flatness of the film F. This makes it possible to reliably bring the film F into intimate contact with the reading magnetic head 8 while the film F is fed, thereby eliminating reading errors. A pressing pad 9 is provided to press the film F against the reading magnetic head 8.

A film cartridge C contains the wound film F therein. The base portion of the film F is coated with a magnetic layer. The foregoing track T is provided at one edge of the film F to record magnetic information, such as data concerning the exposure state and frame number. The two perforations P1 and P2 are formed at the other edge of the film F at positions corresponding to the respective forward and backward portions of a photographic frame.

Formed on the top surface of the film cartridge C is a mark E indicating how much of the film is used in a position relative to the film cartridge C, the mark E being disposed at the peripheral edge of a film-supplying spool SP. A photoreflector 19 is provided at the top of the cartridge C in order to detect the mark E.

Figure 2:
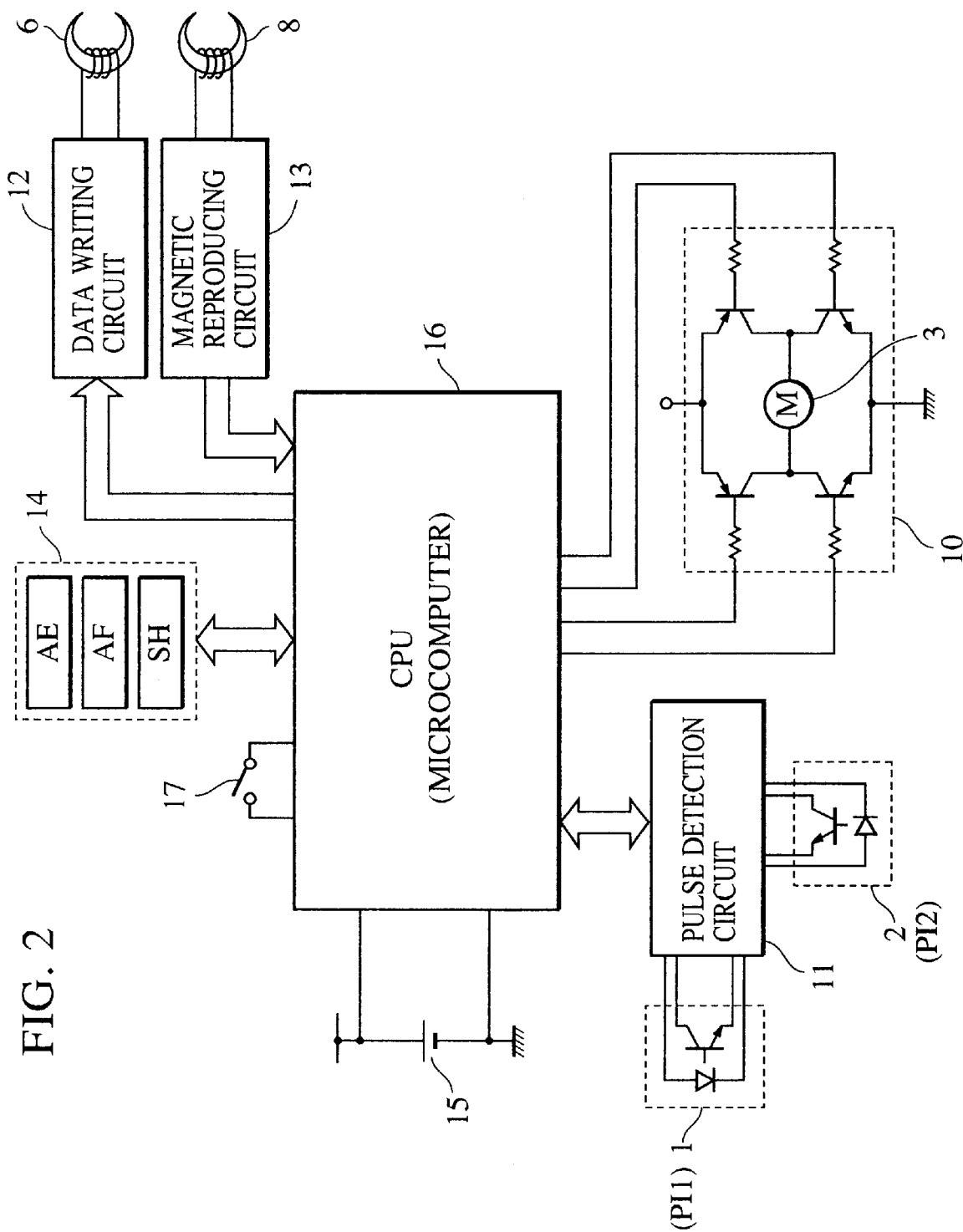
FIG. 2 is a block diagram illustrating the electrical configuration of the camera shown in FIG. 1.

FIG. 2 is a block diagram illustrating the electrical configuration of the foregoing camera shown in FIG. 1. In FIG. 2, a CPU (microcomputer) 16 controls the driving operation of the overall system, and power is supplied to the CPU 16 from a battery 15. The following elements are also connected to the CPU 16. A release switch 17 is actuated when a photographic operation is started. A feeding circuit 10 is operated to wind or unwind the film F. A pulse detection circuit 11 converts the writing timing signal and the reading timing signal generated by the photoreflectors 1 and 2, and outputs the converted signals to the CPU 16. A magnetic-information recording circuit 12 transmits a signal to cause the writing magnetic head 6 to record magnetic information, such as film information or photographic information, on the track T of the film F. A magnetic-information reproducing circuit 13 transmits a signal to cause the reading magnetic head 8 to read the magnetic information from the track T of the film F. An AE/AF/SH circuit 14 is operated to perform automatic exposure, automatic focus, and also to open and close the shutter.

Figure 5:
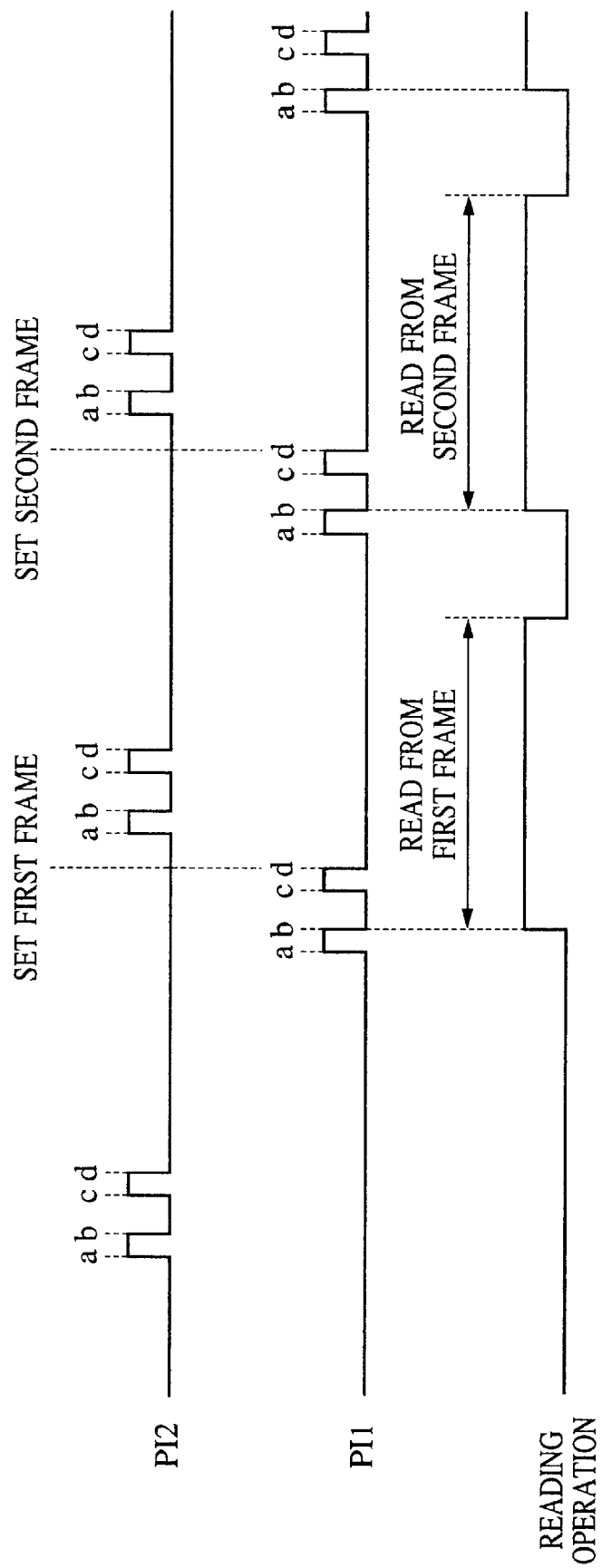
FIG. 5 is a timing chart illustrating the information-reading operation according to the first embodiment of the present invention.

FIG. 3 illustrates the states in which the magnetic information is written into and read from the track T of the film F by the respective magnetic heads 6 and 8 while the film F is fed. FIG. 4 illustrates the timing at which a magnetic recording signal is written by the writing magnetic head 6 while the film F is fed, while FIG. 5 illustrates the timing at which the written magnetic recording signal is read by the reading magnetic head 8 while the film F is fed.

In an actual camera, the positional relationship between the magnetic heads 6 and 8 and the photoreflectors 1 and 2 (hereinafter also referred to as "PI1 and PI2") are as follows.

(A) When, for example, the first photographic frame is set in the aperture of the camera, the photoreflector 1 is positioned on a perforation edge "d" of the film F, while the photoreflector 2 is located between the perforation edges "d" and "a" of the film F. This state can be indicated by FIG. 3A.

Figure 3A:
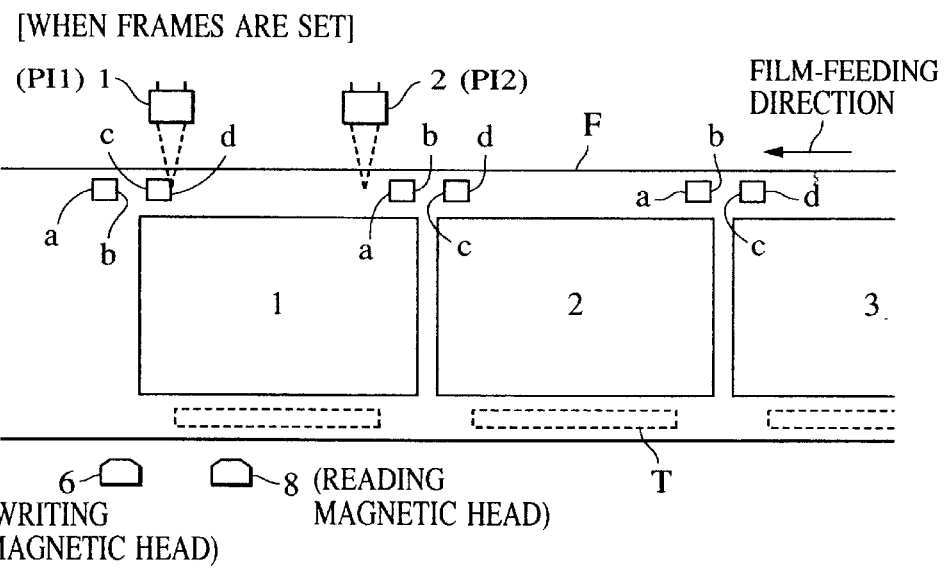
FIG. 3, which is comprised of FIGS. 3A through 3C, illustrates the states in which magnetic information is written into and read from the film used in the camera shown in FIG. 1.
Figure 3B:
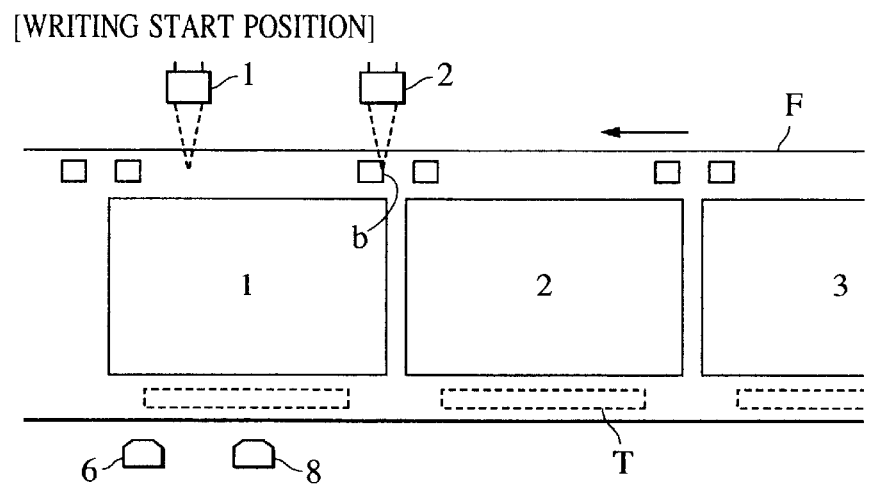

(B) When the perforation edge "b" of the film F passes over the photoreflector 2, the writing magnetic head 6 is located where it is able to start writing information into the frame which has just been exposed. This state is shown in FIG. 3B. Further, the writing magnetic head 6 finishes recording information when the perforation edge "b" passes over the photoreflector 1. This state can be represented by FIG. 3C.

(C) When the perforation edge "b" of the film F passes over the photoreflector 1, the reading magnetic head 8 is placed where it is able to commence reading information from the corresponding frame. This state can be designated by FIG. 3C.

Figure 6:
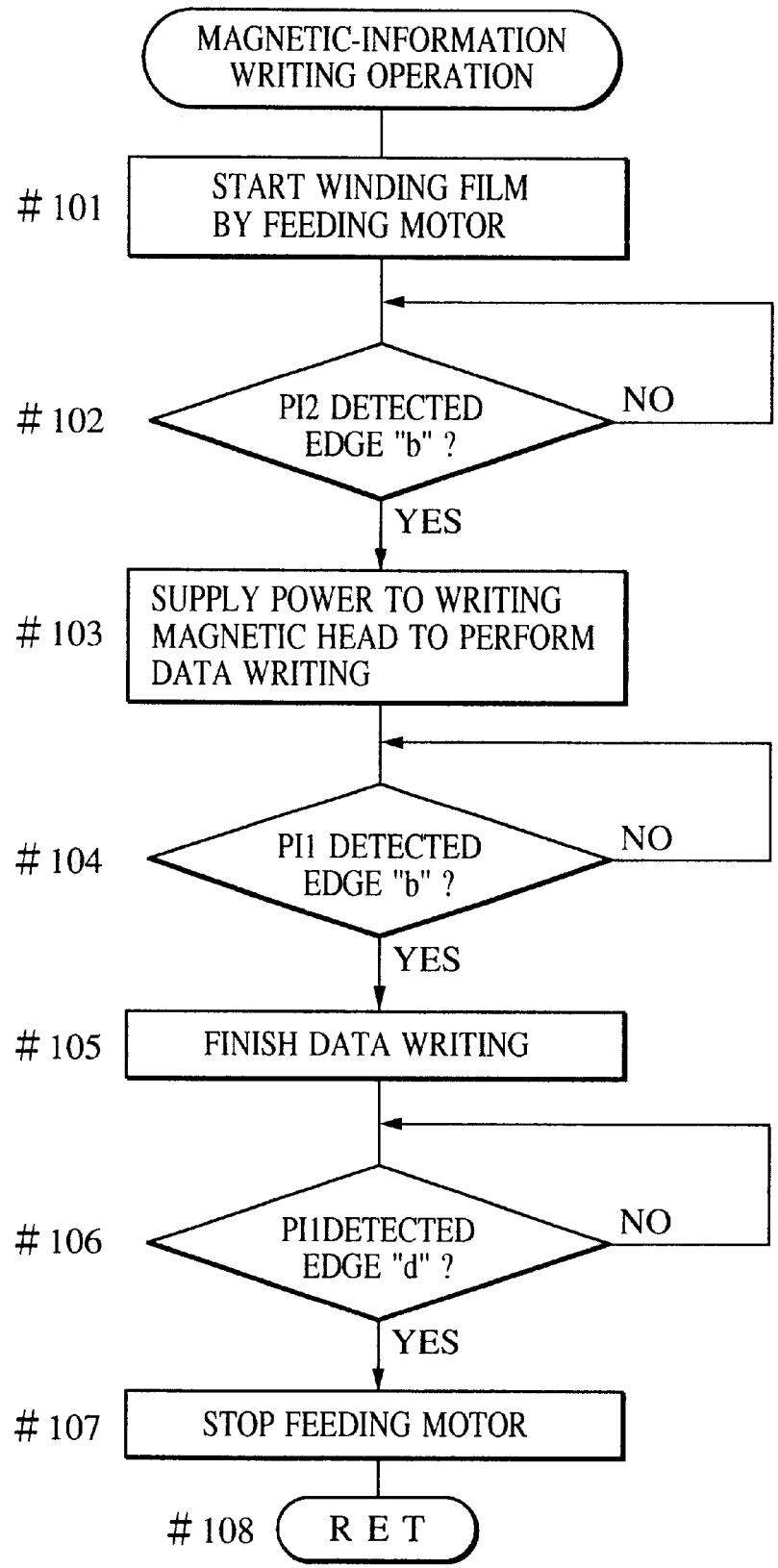
FIG. 6 is a flow chart illustrating the writing operation process according to the first and second embodiments of the present invention.
Figure 7:
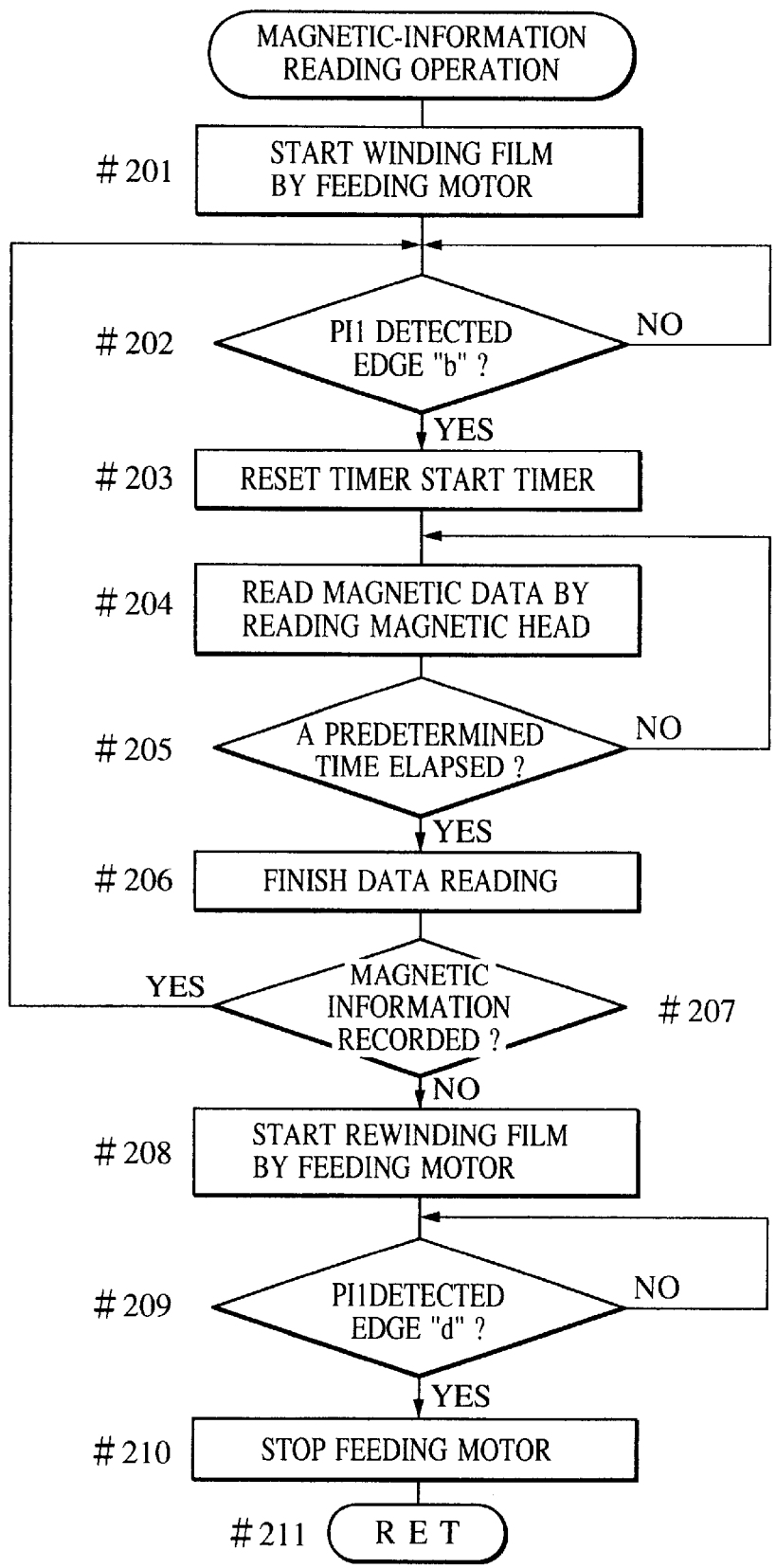
FIG. 7 is a flow chart illustrating the reading operation process according to the first embodiment of the present invention.

FIG. 6 is a flow chart illustrating the process of writing magnetic information into the film F executed by the CPU 16, while FIG. 7 is a flow chart illustrating the process of reading magnetic information from the film F executed by the CPU 16.

More specifically, a detailed explanation will now be given of the magnetic-information writing operation through illustration of the flow chart of FIG. 6 while also referring to FIGS. 3 and 4. The writing operation is performed after the following procedures: the film F is loaded into the camera (not shown) and the frame to be exposed is set, and then, the release switch 17 is actuated to expose the film F by certain operations, such as rangefinding, photometering, and opening and closing the shutter.

In step #101, the feeding motor 3 is driven to feed the film F in the direction in which the film F is wound around the take-up spool 18. Then, it is determined in step #102 whether the perforation edge "b" of the film F has been detected by PI2, which is indicated by the timing signal for starting to write photographic information in the form of a magnetic signal into the track T of the previously exposed frame, i.e., whether the state represented by FIGS. 3B and 4 has been reached. Step #102 is repeated until an affirmative answer to this question is obtained. The processing then proceeds to step #103 in which current flows in the writing magnetic head 6 to commence writing magnetic information onto the film F.

Figure 3C:
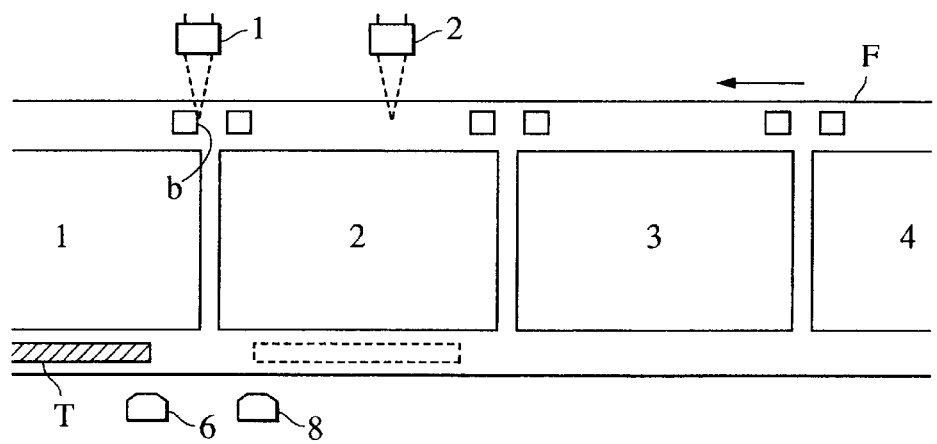

Subsequently, it is determined in step #104 whether the perforation edge "b" of the film F has been detected by PI1, which is indicated by the timing signal for finishing data writing, i.e., whether the state represented by FIGS. 3C and 4 has been reached. If the answer of step #104 is no, the magnetic information continues to be written by the writing magnetic head 6. On the other hand, if the answer of step #104 is yes, the processing proceeds to step #105 in which the current supplied to the writing magnetic head 6 is stopped to complete the magnetic-information writing operation.

It is further judged in step #106 whether the perforation edge "d" of the film F to be subsequently exposed has been detected by PI1, and more specifically, whether the subsequent frame of the film F has been set in the aperture of the camera, i.e., whether the state represented by FIGS. 3A and 4 has been reached. Step #106 is repeated until an affirmative answer to this question is obtained. Then, the processing proceeds to step #107 in which the feeding motor 3 is stopped, and the subsequent step #108 is executed. The camera can thus be in the standby position for exposing the subsequent frame.

It should be noted that the foregoing processing steps #102, #104 and #106 may be executed by known interrupt-handling.

A detailed explanation will now be given of the operation of reading the magnetic information from the film F through illustration of the flow chart of FIG. 7 while also referring to FIGS. 3 and 5. This reading operation is performed in order to set an unexposed frame of the film F after the partially exposed film F has been loaded into the camera (not shown). For convenience, it will now be assumed in the following explanation that the magnetic information recorded on the second frame be read.

In step #201, the feeding motor 3 is driven to start feeding the film F in the direction in which the film F is wound around the take-up spool 18. It is then judged in step #202 whether the perforation edge "b" provided for the frame from which the information will be read (for example, the first frame if the film has just been loaded) has been detected by PI1, which is indicated by the timing signal for starting to read the magnetic information from the associated frame, i.e., whether the state represented by FIGS. 3C and 5 has been reached. Step #202 is repeated until an affirmative answer to this question is obtained. Then, the processing proceeds to step #203 in which the timer (not shown) is reset and started. In step #204, the reading magnetic head 8 is actuated to commence reading the magnetic information from the film F. It is then determined in step #205 whether a predetermined duration for completing the reading operation has elapsed. If the answer of step #205 is no, the processing returns to step #204 in which the reading magnetic head 8 continues to read the magnetic information. In contrast, if the answer of step #205 is yes, the processing proceeds to step #206 to complete the magnetic-information reading operation.

Thereafter, a query is made in step #207 as to whether there is magnetic information recorded in the magnetic signal which has been read through processing steps #204 through #206. If the answer to this query is yes, it is concluded that the corresponding frame has been exposed. The processing then returns to step #202, and the following processing steps #203 through #207 are repeated in order to read the magnetic signal from the subsequent frame.

If it is found in step #207 that there is no magnetic information written into the frame, it is concluded that the frame has not yet been exposed, and the processing proceeds to step #208. At this point, the frame which has been determined to be unexposed in step #207 is displaced from the aperture of the camera in the winding direction. Accordingly, in step #208 power is supplied to the feeding motor 3 in the unwinding direction to unwind the film F. It is then determined in step #209 whether the perforation edge "d" of the film F has been detected by PI1, in other words, whether the unexposed frame of the film F has been set in the aperture of the camera, i.e., whether the state represented by FIG. 3A has been reached. Step #209 is repeated until the affirmative answer to this query is obtained. Subsequently, the processing proceeds to step #210 in which the feeding motor 3 is stopped. The processing in step #211 is further executed to complete the information reading operation. The camera can thus be in the standby position to expose the subsequent frame.

It should be noted that the foregoing processing steps #202, #205 and #209 may be executed by known interrupt-handling.

The writing timing signals used in the writing operation explained with reference to the flow chart of FIG. 6 include, as shown in FIG. 4, the writing-start timing signal indicating that the perforation edge "b" of the film F has been detected by PI2 and the writing-end timing signal indicating that the perforation edge "b" of the film F has been detected by PI1.

Moreover, the reading timing signals employed in the reading operation explained while referring to the flow chart of FIG. 7 include, as illustrated in FIG. 5, the reading-start timing signal indicating that the perforation edge "b" of the film F has been detected by PI1 and the reading-end timing signal indicating that a predetermined duration has elapsed after the generation of the reading-start timing signal.

FIGS. 3 through 5 reveal that only part of the track T would be read if the reading operation was started at the time at which the photoreflector PI2 in place of PI1 has detected the perforation edge "b" of the film F.

In the foregoing embodiment, PI1 is used for setting an unexposed frame, completing the writing operation, and starting the reading operation, while PI2 is employed for commencing the writing operation. If, however, there is no limitation on space, photointerrupters specifically used for obtaining the above-described respective writing timing and reading timing may be provided to perform the reading operation and the writing operation.

Figure 8:
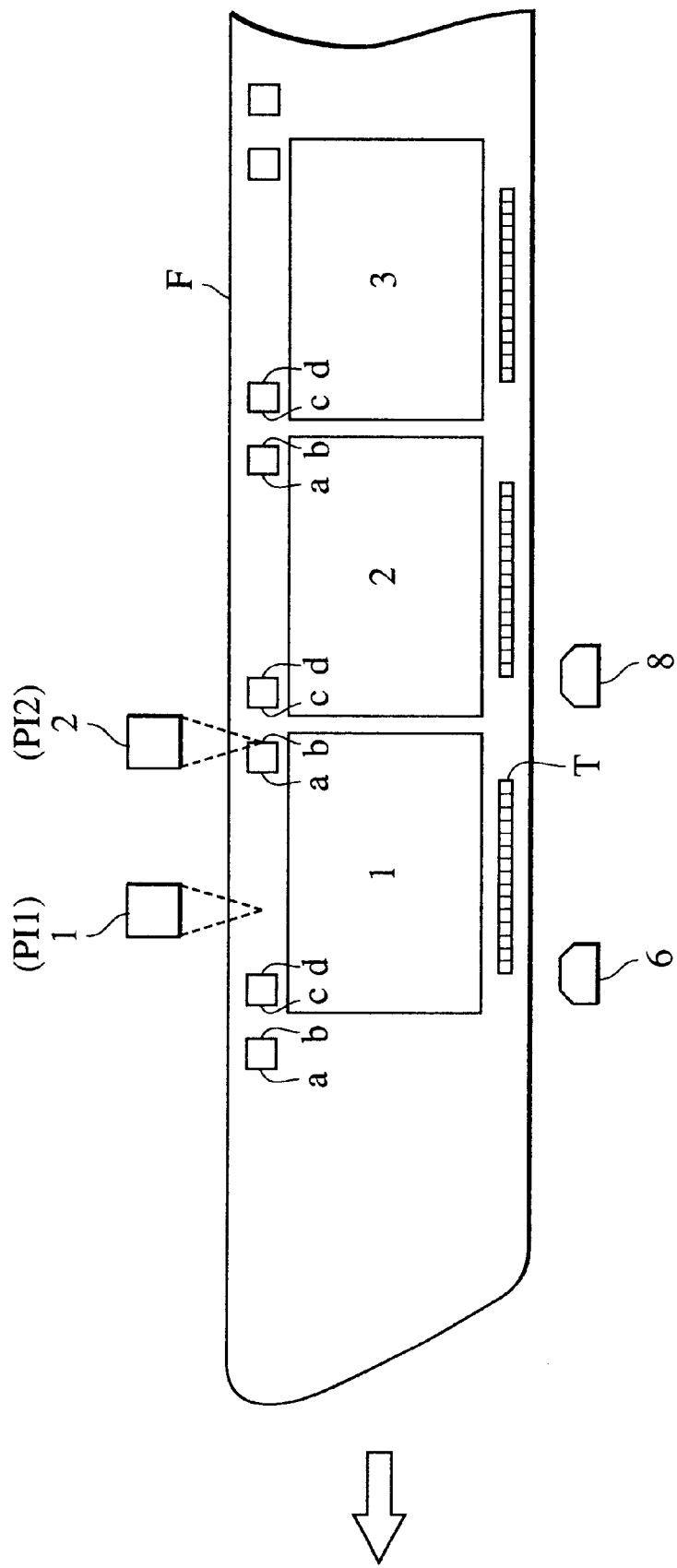
FIG. 8 illustrates the state in which magnetic information is written into and read from the film according to the second embodiment of the present invention.
Figure 9:
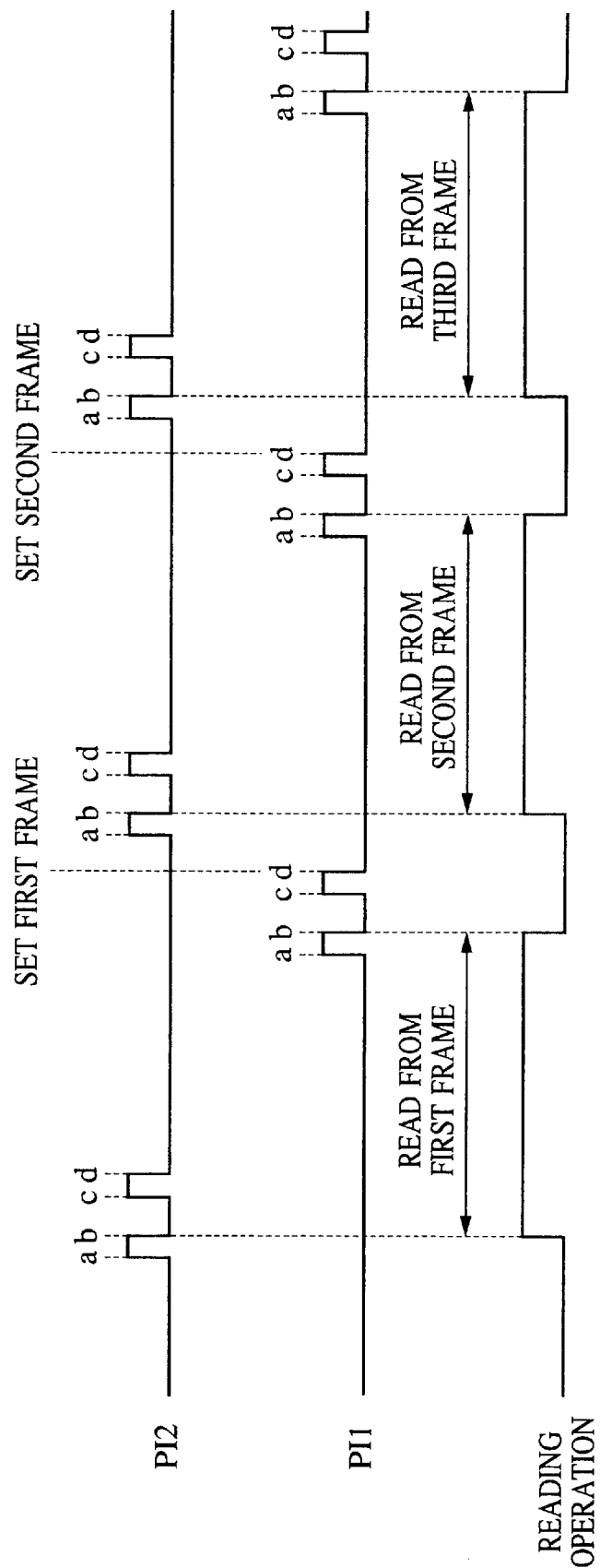
FIG. 9 is a timing chart illustrating the information-reading operation according to the second embodiment of the present invention.
Figure 10:
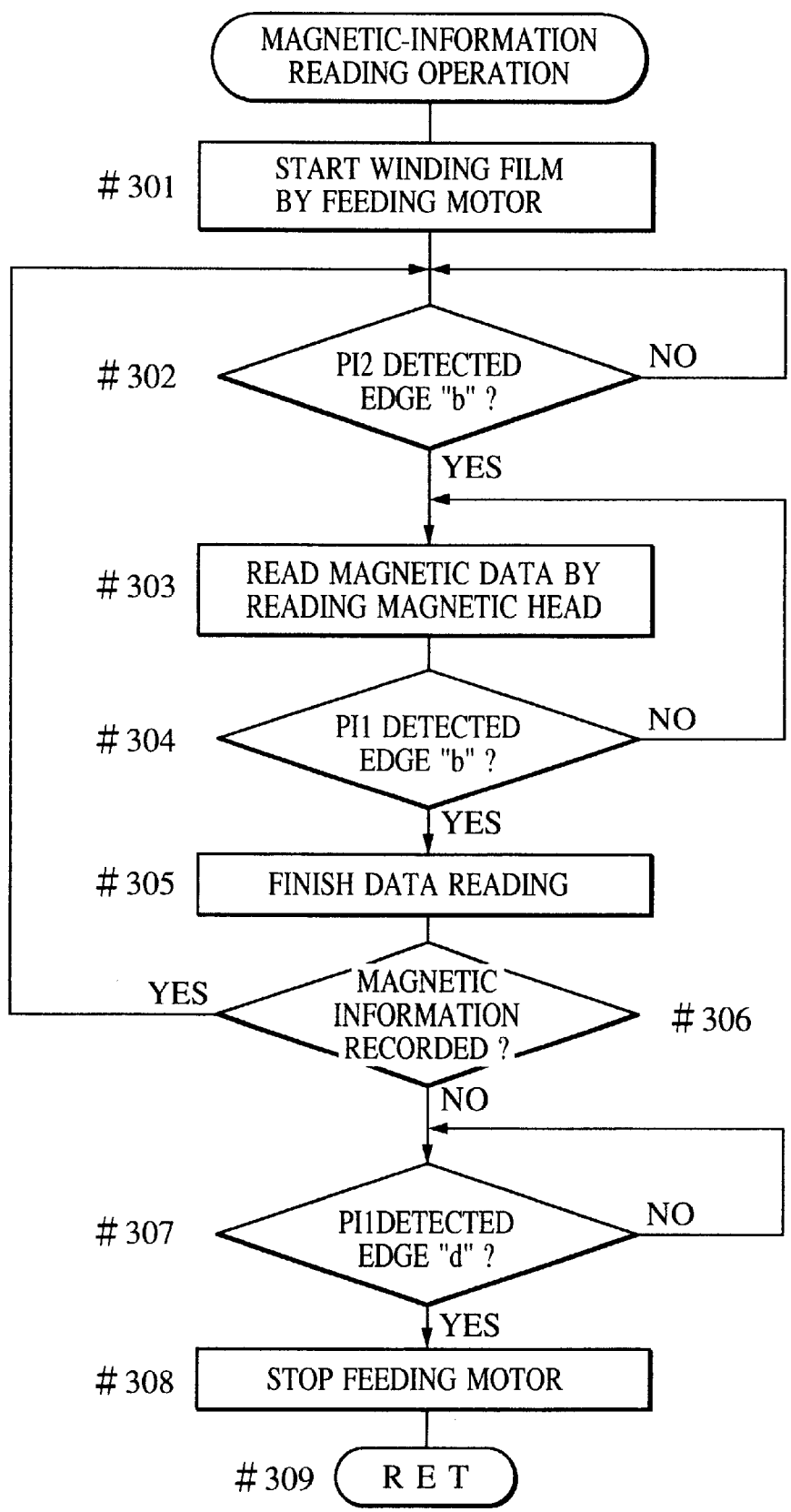
FIG. 10 is a flow chart illustrating the reading operation process according to the second embodiment of the present invention.

FIGS. 8 through 10 illustrate a camera according to a second embodiment of the present invention. More specifically, FIG. 8 indicates the state in which magnetic information is written into and read from the track T of the film F by the respective magnetic heads 6 and 8 while the film F is fed. The camera shown in FIG. 8 differs from the counterpart illustrated in FIG. 3 in that the reading magnetic head 8 is located at the rear of the writing magnetic head 6 by an amount substantially equal to one frame (in the direction away from the motor 3). FIG. 9 illustrates the timing at which the magnetic recording signal written into the film F is read by the reading magnetic head 8 while the film F is fed. FIG. 10 is a flow chart illustrating the processing operation performed by the CPU 16 when the magnetic information is read from the film F.

The electrical configuration of the camera of the second embodiment is similar to that shown in FIG. 2, and a representation and explanation thereof will be thus omitted. The operation of writing the magnetic information into the film F performed in the second embodiment is also similar to that of the first embodiment, and a detailed representation and explanation thereof will thus be omitted.

The operation of reading the magnetic information from the film F will now be described through illustration of the flow chart of FIG. 10 while also referring to FIG. 9. This reading operation is carried out in order to reuse the partially exposed film F after it has been reloaded into the camera (not shown).

In step #301, the feeding motor 3 is driven to start feeding the film F in the winding direction. It is then judged in step

302 whether the perforation edge "b" provided for the frame from which the magnetic information will be read (for example, the first frame if the film has just been loaded) of the film F has been detected by PI2, which is indicated by the timing signal for starting to read the magnetic information from the above frame. (If the reading operation is conducted merely to determine whether there is any unexposed frame in the film F, a broad determination as to whether there is magnetic information written into the corresponding frame is sufficient. Thus, step #302 may be modified to count a predetermined time after it has been judged whether the perforation edge "a" or "b" has been detected by PI2). Step #302 is repeated until an affirmative answer to this query is obtained (FIG. 9). Then, the processing proceeds to step #303 in which the reading magnetic head 8 commences to read the magnetic information from the film F.

Subsequently, a query is made in step #304 as to whether the perforation edge "b" of the film F has been detected by PI1, which is indicated by the timing signal for completing the reading operation. (In step #304, as well as in step #302, if the reading operation is performed only to determine whether there is any unexposed frame in the film F, a broad determination as to whether there is magnetic information written into the corresponding frame is sufficient. Thus, step #304 may be modified to count a predetermined time after it has been judged whether the perforation edge "a" or "b" has been detected by PI1. Alternatively, in step #302 after PI2 has detected the perforation edge "a" or "b", a timer (not shown) may be started to count a predetermined time.) If an answer to the query made in step #304 is no, the processing returns to step #303 in which the reading magnetic head 8 continues to read the magnetic information. If an affirmative answer to the query in step #304 has been obtained (FIG. 9), the processing proceeds to step #305 in which the reading operation is completed. A question is then asked in step #306 as to whether there is magnetic information recorded in the magnetic signal which has been read from the film F through processing steps #303 through #305. If the answer to this question is yes, it is concluded that the corresponding frame has been exposed, and the processing returns to step #302. Then, the subsequent processing steps #303 through #306 are repeated in order to read a magnetic signal of the subsequent frame.

On the other hand, if it is found in step #306 that the there is no magnetic information recorded on the corresponding frame, it is concluded that the frame is not yet exposed. The processing then proceeds to step #307 in which a query is made as to whether the perforation edge "d" has been detected by PI1, in other words, whether the unexposed frame has been set in the aperture of the camera. Step #307 is repeated until an affirmative answer to this question is obtained (FIG. 9). Subsequently, the processing proceeds to step #308 in which the motor 3 is stopped, and the subsequent step #309 is executed to complete the reading operation. The camera can thus be in the standby position to expose the subsequent frame.

The reading timing signals employed in the foregoing reading operation which has been explained with reference to the flow chart of FIG. 10 include the reading-start timing signal indicating that PI2 has detected the perforation edge "b" of the film F (or a predetermined time has elapsed after PI2 has detected the perforation edge "a" or "b"), and the reading-end timing signal indicating that PI1 has detected the perforation edge "b" of the film F (or a predetermined time has elapsed after PI1 or PI2 has detected the perforation edge "a" or "b").

FIGS. 4 and 9 reveal that the reading operation is started at the time at which PI2 has detected the perforation edge "b" of the film F, which is led for one frame earlier than the edge "b" detected by PI2 when the writing operation is commenced.

In the foregoing embodiment, PI1 is used for setting an unexposed frame, and completing the writing operation and the reading operation, while PI2 is employed for commencing the writing operation and the reading operation. If, however, there is no limitation on space, photointerrupters specifically used for obtaining the above-described respective writing timing and the reading timing may be provided to perform the reading operation and the writing operation.

Moreover, a pulse plate or the like may be provided with the shaft of the feeding motor 3 to detect the rotational velocity, the rotational angle, and the position of a perforation provided with the film. The values detected in the above manner may be then used as timing signals to perform the reading and writing operations.

According to the foregoing embodiments, the reading magnetic head 8 is located close to the film cartridge C, while the writing magnetic head 6 is positioned near the take-up spool 18. This arrangement of the respective heads 6 and 8 makes the layout of the product easy, and also minimizes the reading errors because the flatness of the film can be ensured due to the positioning of the reading magnetic head 8.

Further, since the reading magnetic head 8 is placed away from the take-up spool 18 which contains the feeding motor 3, the head 8 can be free from the influence of magnetic noise produced by the motor 3 during the reading operation.

The foregoing positional relationship between the heads 6 and 8 makes it also possible to write the magnetic information into the exposed frame while the film is still fed in the winding direction. Also, a complicated operation, such as a film-unwinding operation, is unnecessary for setting an unexposed frame in the aperture of the camera when partially exposed film is used (it is necessary in the first embodiment, however, that a slight portion of the film should be rewound).

Additionally, the writing magnetic head 6, the reading magnetic head 8, and the photoreflectors 1 and 2 are located relative to each other, as shown in FIGS. 3 and 8, thereby making it possible to optimally perform the writing and reading operations of the magnetic information.

As is seen from the description of the foregoing embodiments, the camera of the present invention offers the following advantages.

The writing means (writing magnetic head) is disposed in the vicinity of the leading portion of the film, while the reading means (reading magnetic head) is located near the trailing portion of the film. The reading means is accordingly positioned to match the aperture of the camera. The camera provided with the writing means and the reading means separately in the above manner has high flexibility free from the problems suffered by the related art.

The reading means is placed away from the driving means (motor) used for feeding film so as to be protected from noise generated by the driving means. The reading means is thus less vulnerable to magnetic noise traveling from the driving means while magnetic information is read, which would otherwise cause reading errors.

Moreover, the writing means, the reading means, and a single signal-generating means (photoreflector) are located to satisfy the following requirements. When the signal-generating means detects the perforation positioned at the trailing portion of the frame which has been set in the aperture, the writing means faces the position at which it is able to start writing magnetic information into the above frame, while the reading means is placed behind substantially for one frame later than the writing means. As a consequence, the writing-start timing signal and the reading-start timing signal can be suitably provided to perform the appropriate writing and reading operations.

Further, the writing means, the reading means, the first and second signal-generating means (photoreflectors) are positioned to meet the following requirements. When the second signal-generating means detects the perforation positioned at the trailing portion of the frame which has been set in the aperture, the writing means faces the position at which it is able to start writing magnetic information into the above frame, and the subsequent frame is set in the aperture. Then, when the first signal-generating means detects the perforation positioned at the trailing portion of the frame, the reading means faces the position at which it is able to commence reading the magnetic information from the frame. It is therefore possible to provide the appropriate writing-start timing signal and the reading-start timing signal to achieve suitable writing and reading operations.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, the present invention may be applicable to cases where information may be recorded on and reproduced from film by means other than electronic, optical, or magnetic means.

Further, film other than the type of film used in the foregoing embodiment may be used in the present invention. Image recording mediums in forms other than the film may also be employed.

Also, the software system and the hardware system used in the foregoing embodiments may be exchangeable as necessary. Further, the foregoing embodiments may be combined with each other or the technical elements forming the embodiments may be combined according to the necessity so as to implement the present invention.

Moreover, each claim or the configuration of each embodiment of the present invention may wholly or partially form one apparatus, or may be combined with another apparatus, or may constitute elements to form an apparatus.

Additionally, the present invention may be used in various types of cameras, such as single-lens reflex cameras, lens-shutter cameras and video cameras. The invention may also be employed in optical equipment other than cameras and other types of devices. The invention may be further applicable to apparatuses used with and to elements used in the above-described cameras, optical equipment, or the other types of devices.

What is claimed is:

1. A camera for use with a film cartridge, the film cartridge containing a film that is fed out from the film cartridge, said camera comprising:

a film winding spool, where a film fed out from a film cartridge loaded in said camera is wound around the film winding spool;

a motor disposed in the interior of said film winding spool;

a recording head that records magnetic information on the film;

a reading head that reads magnetic information recorded on the film, said reading head being located on a side of said recording head further away from the film winding spool than said recording head, wherein a distance between said reading head and said recording head is selected to be equal to the width of a frame of the film;

a first detector for detecting perforations of the film;

a second detector for detecting perforations of the film; and a control circuit for controlling said recording head and said reading head on the basis of detection results of said first detector and said second detector.

2. A camera according to claim 1, wherein said first detector detects through perforations provided in the film a timing at which a recording operation performed by said recording head is started and a timing at which a reading operation performed by said reading head is started.

3. An apparatus for use with a film cartridge, the film cartridge containing a film that is fed out from the film cartridge, said apparatus comprising:

a film winding spool, where a film fed from a film cartridge loaded in said apparatus is wound around the film winding spool;

a motor disposed in the interior of said film winding spool;

a recording head that records magnetic information on the film;

a reading head that reads magnetic information recorded on the film, said reading head being located on a side of said recording head further away from the film winding spool than said recording head, wherein a distance between said reading head and said recording head is selected to be equal to a width of a frame of the film;

a first detector for detecting perforations of the film;

a second detector for detecting perforations of the film; and a control circuit for controlling said recording head and said reading head on the basis of detection results of said first detector and said second detector.

4. An apparatus according to claim 3, wherein said first detector detects through perforations provided in the film a timing at which a recording operation performed by said recording head is started and a timing at which a reading operation performed by said reading head is started.

* * * * *

UNITED STATES PATENT AND TRADEMARK OFFICE
CERTIFICATE OF CORRECTION

PATENT NO. : 6,347,194 B2
DATED : February 12, 2002
INVENTOR(S) : Teruyuki Okado It is certified that error appears in the above-identified patent and that said Letters Patent is hereby corrected as shown below:

Title page,
Item [56], References Cited, U.S. PATENT DOCUMENTS,
"Tguji et al." should read -- Tsuji et al. --.
"Shen et al." should read -- Shon et al. --.
"Tahara et al." should read -- Tanaka et al. --.
"Kunshige" should read -- Kunishige --.

Drawings,
Sheet No. 6, Figure 6, "PIlDETECTED" should read -- PI1 DETECTED --.
Sheet No. 7, Figure 7, "PIlDETECTED" should read -- PI1 DETECTED --.
Sheet No. 10, Figure 10, "PIlDETECTED" should read -- PI1 DETECTED --.

Column 2,
Line 11, "comprises:" should read -- comprises --.

Column 6,
Line 33, "photointerrupters" should read -- photo-interrupters --.

Column 7,
Line 12, "PI2)." should read -- PI2.) --.
Line 44, "the" (second occurrence) should be deleted.

Column 8,
Line 10, "photointerrupters" should read -- photo-interrupters --.
Line 66, "located" should read -- positioned --.

UNITED STATES PATENT AND TRADEMARK OFFICE
CERTIFICATE OF CORRECTION

PATENT NO. : 6,347,194 B2
DATED : February 12, 2002
INVENTOR(S) : Teruyuki Okado It is certified that error appears in the above-identified patent and that said Letters Patent is hereby corrected as shown below:

<u>Column 9,</u>
Line 46, "the" should be deleted.

Signed and Sealed this

Eighteenth Day of June, 2002

*Attest:*

*Attesting Officer*

JAMES E. ROGAN
*Director of the United States Patent and Trademark Office*